(12) United States Patent
Zhu et al.

(10) Patent No.: US 10,732,752 B1
(45) Date of Patent: Aug. 4, 2020

(54) DISPLAY PANEL AND DISPLAY DEVICE

(71) Applicant: XIAMEN TIANMA MICRO-ELECTRONICS CO., LTD., Xiamen (CN)

(72) Inventors: Yihua Zhu, Xiamen (CN); Xiai Xu, Xiamen (CN); Bingping Liu, Xiamen (CN); Guozhao Chen, Xiamen (CN)

(73) Assignee: XIAMEN TIANMA MICRO-ELECTRONICS CO., LTD., Xiamen (CN)

(*) Notice: Subject to any disclaimer, the term of this patent is extended or adjusted under 35 U.S.C. 154(b) by 0 days.

(21) Appl. No.: 16/437,419

(22) Filed: Jun. 11, 2019

(30) Foreign Application Priority Data

Mar. 26, 2019 (CN) .......................... 2019 1 0231320

(51) Int. Cl.
  *G06F 3/041* (2006.01)
(52) U.S. Cl.
  CPC .......... *G06F 3/0412* (2013.01); *G06F 3/0416* (2013.01)
(58) Field of Classification Search
  CPC ...... G06F 3/041; G06F 3/0412; G06F 3/0416; G09G 3/3266; G09G 3/3275; G09G 3/3666; G09G 3/3677; G09G 3/3688; G09G 2310/0297
  See application file for complete search history.

(56) References Cited

U.S. PATENT DOCUMENTS

| 7,714,826 B2* | 5/2010 | Jang | G09G 3/3688 345/100 |
| 2004/0227710 A1* | 11/2004 | Shimizu | G09G 3/3648 345/87 |
| 2005/0140666 A1* | 6/2005 | Shin | G09G 3/3283 345/211 |
| 2009/0289878 A1* | 11/2009 | Chen | G09G 3/3688 345/87 |
| 2010/0156776 A1* | 6/2010 | Jeoung | G09G 3/3688 345/98 |
| 2013/0257846 A1* | 10/2013 | Matsuda | G09G 3/3648 345/212 |

(Continued)

FOREIGN PATENT DOCUMENTS

CN  101581863 A  * 11/2009 .......... G09G 3/3666
CN  101581863 A    11/2009

*Primary Examiner* — Joe H Cheng
(74) *Attorney, Agent, or Firm* — Anova Law Group PLLC

(57) ABSTRACT

The present disclosure provides a display panel and a display device, including: a display area and a non-display area, that the display area includes data lines, and the non-display area includes a binding area including conductive pads; a multiplex distribution circuit including demultiplexers, that each of demultiplexers includes: one input terminal, N output terminals, N first switching elements; and connecting lines. The one input terminal and the conductive pads are electrically connected, and the N output terminals are electrically connected to the data lines. First electrodes of the N first switching elements are electrically connected to the one input terminal, and second electrodes are electrically connected to the N output terminals. The demultiplexers include at least one first demultiplexer. The N First switching elements of the at least one first demultiplexer are disposed in the display area. N is a positive integer and N≥2.

20 Claims, 16 Drawing Sheets

(56) References Cited

U.S. PATENT DOCUMENTS

| | | | |
|---|---|---|---|
| 2013/0300722 A1* | 11/2013 | Gyouten | G09G 3/3685 345/204 |
| 2015/0287749 A1* | 10/2015 | Miyake | H01L 27/1255 257/71 |
| 2018/0061339 A1* | 3/2018 | Long | G09G 3/3685 |
| 2018/0330653 A1* | 11/2018 | Zhou | G02F 1/13452 |
| 2018/0336809 A1* | 11/2018 | Xi | G09G 3/20 |
| 2019/0012948 A1* | 1/2019 | Ohara | G09G 3/3258 |
| 2019/0189059 A1* | 6/2019 | Na | G09G 3/3291 |
| 2020/0013367 A1* | 1/2020 | Tomie | G09G 3/3688 |

* cited by examiner

DISPLAY PANEL AND DISPLAY DEVICE

CROSS-REFERENCES TO RELATED APPLICATIONS

This application claims the priority of Chinese Patent Application No. CN201910231320.0, filed on Mar. 26, 2019, the entire contents of all of which are incorporated herein by reference.

FIELD OF THE DISCLOSURE

The present disclosure generally relates to the field of display technologies and, in particular, relates to a display panel and a display device.

BACKGROUND

Display technologies play a very important role in today's human society and are widely used in all aspects of industry and life.

In recent years, with the development of economy, people have higher and higher requirements for visual effects. To be convenient to use and aesthetically pleasing, current display devices tend to be full screen and narrow border, that is, a non-display area of a display panel only occupies a small area, a display device has a narrow border, and a display interface is almost completely covered by a screen. Existing full screen devices do not achieve 100% coverage. A common full-screen mobile phone is only a frameless design, which reduces proportion of a screen border on a front of a mobile phone, to pursue a screen ratio close to 100%.

The non-display area of the display panel is mainly composed of a flexible printed circuit board, an integrated chip, a fan-out area, and a multiplex distribution circuit. The integrated chip has typically fixed size, and the flexible printed circuit board and data outputs in existing designs have been difficult to scale down.

Therefore, how to reduce the non-display area of the display panel and realize the narrow border is a technical problem to be solved by those skilled in the art.

BRIEF SUMMARY OF THE DISCLOSURE

One aspect of the present disclosure provides a display panel including: a display area and a non-display area, that the display area includes a plurality of data lines, the plurality of data lines extends along a first direction, the plurality of data lines is arranged along a second direction, the non-display area includes a binding area, and the binding area includes a plurality of conductive pads; a multiplex distribution circuit, that the multiplex distribution circuit includes a plurality of demultiplexers, and each of the plurality of demultiplexers includes: one input terminal, N output terminals together corresponding to the one input terminal, and N first switching elements each used to connect the one input terminal with an output terminal of the N output terminals; and a plurality of connecting lines each connecting line connecting the one input terminal of a demultiplexer of the plurality of demultiplexers with a conductive pad of the plurality of conductive pads, that each of the N output terminals is electrically connected to one data line of the plurality of data lines, and the plurality of demultiplexers includes at least one first demultiplexer each having the N first switching elements that are disposed in the display area; where N is a positive integer and N≥2.

Another aspect of the present disclosure provides a display device including the display panel provided by the present disclosure.

Other aspects of the present disclosure can be understood by those skilled in the art in light of the description, the claims, and the drawings of the present disclosure. Further features of the present disclosure and its advantages will become apparent from the following detailed description of exemplary embodiments.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
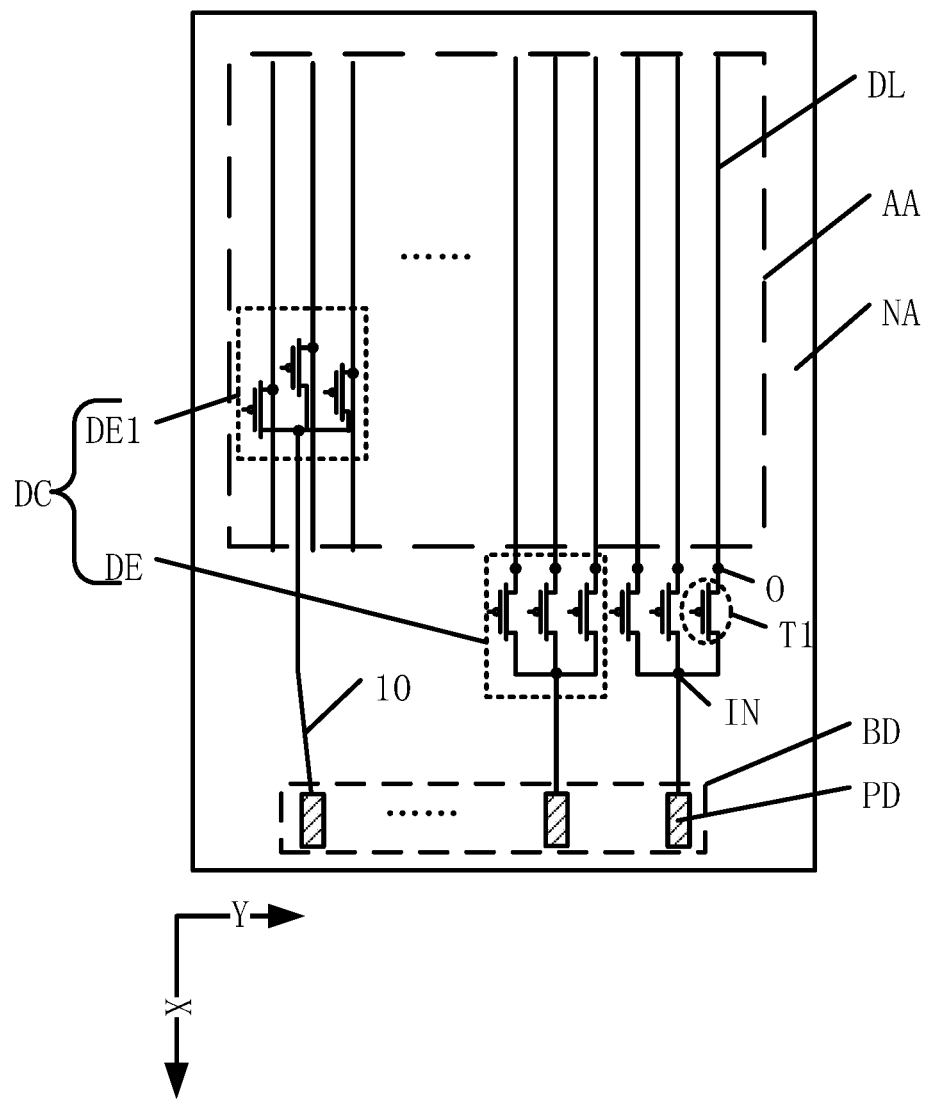
FIG. 1 is a schematic plan view showing a display panel according to one embodiment of the present disclosure.

Various exemplary embodiments of the present disclosure are described in detail with reference to the drawings. It should be noted that the relative arrangement of the components and steps, numerical expressions, and numerical values set forth in the exemplary embodiments are not intended to limit the scope of the present disclosure unless otherwise specified.

The following description of at least one exemplary embodiment is merely illustrative, and never in any way limits the present disclosure and its application or use.

Techniques, methods, and apparatus known to those skilled in the art may not be discussed in detail, but the techniques, the methods, and the apparatus should be considered as part of the present disclosure, where appropriate.

In all of the examples shown and discussed herein, any specific values are to be construed as illustrative only and not as a limitation. Thus, other examples of the exemplary embodiments may have different values.

It should be noted that similar reference numerals and letters indicate similar items in the following drawings, and therefore, once an item is defined in one drawing, it is not required to be further discussed in the subsequent drawings.

Referring to FIG. 1, FIG. 1 is a schematic plan view showing a display panel according to one embodiment of the present disclosure.

One embodiment provides a display panel, including:
- a display area AA and a non-display area NA, that the display area AA includes a plurality of data lines DL, the plurality of data lines DL extends along a first direction X, and the plurality of data lines DL is arranged along a second direction Y; and the non-display area NA includes a binding area BD, and the binding area BD includes a plurality of conductive pads PD;
- a multiplex distribution circuit DC, that the multiplex distribution circuit DC includes a plurality of demultiplexers DE; and each of the plurality of demultiplexers DE includes: one input terminal IN, N output terminals O together corresponding to the one input terminal IN, and N first switching elements T1 each used to connect the one input terminal IN with an output terminal O of the N output terminals O; and
- a plurality of connecting lines 10, that the one input terminal IN of a demultiplexer DE of the plurality of demultiplexers DE is electrically connected to a conductive pad PD of the plurality of conductive pads PD through a connecting line 10 of the plurality of connecting lines 10, and each of the N output terminals O is electrically connected to one data line of the plurality of data lines; for each of the plurality of demultiplexers DE, each first electrode of the N first switching elements T1 is electrically connected to the one input terminal IN, and each second electrode of the N first switching elements T1 is electrically connected to each of the N output terminals O; and the plurality of demultiplexers DE includes at least one first demultiplexer DE1 each having the N first switching elements T1 that are disposed in the display area AA; where N is a positive integer and N⩾2.

The display panel provided in one embodiment includes the display area AA and the non-display area NA. The display area AA is used to display image information. For example, a plurality of pixels (not shown) may be disposed in the display area AA. The non-display area NA does not have a display function and is used to set a circuit, an electronic component, or the like.

The plurality of data lines DL are disposed in the display area AA, and the plurality of data lines DL may transmit electrical signals for pixels in the display area AA to cause the pixels to display corresponding images.

The non-display area NA includes the binding area BD, and the binding area BD can bind an electronic component, such as an integrated circuit chip, a flexible circuit board, etc., which is not specifically limited in one embodiment. The bonding area BD includes the plurality of conductive pads PD, which is electrically connected to electronic components and is used to transmit electrical signals to the electronic components.

To reduce the number of the plurality of conductive pads PD, the plurality of data lines DL in the display area AA is electrically connected to the plurality of conductive pads PD through the multiplex distribution circuit DC. For example, the multiplex distribution circuit DC includes the plurality of demultiplexers DE, that each of the plurality of demultiplexers DE includes: the one input terminal IN, the N output terminals O together corresponding to the one input terminal IN, and the N first switching elements T1 each used to connect the one input terminal IN with an output terminal of the N output terminals, where N is a positive integer greater than or equal to 2. Each connecting line of the plurality of connecting lines 10 is used for transmitting electrical signals of a conductive pad of the plurality of conductive pads PD to the one input terminal IN of a demultiplexer of the plurality of demultiplexers DE, and the N output terminals O of the plurality of demultiplexers DE are electrically connected one-to-one to the plurality of data lines DL, respectively. Electrical signals of the plurality of conductive pads PD are transmitted via the plurality of connecting lines 10 to the one input terminal IN of the plurality of demultiplexers DE, and can be output from any of the N output terminals O of the plurality of demultiplexers DE, under data selection of the plurality of demultiplexers DE.

For example, in each of the plurality of demultiplexers DE, each first electrode of the N first switching elements T1 and the one input terminal IN are electrically connected, and each second electrode of the N first switching elements T1 and each of the N output terminals O are electrically connected. The N first switching elements T1 have an on state and an off state. By controlling the on and off states of the N first switching elements T1 in each of the plurality of demultiplexers DE, an electrical signal of the one input terminal IN can be time-divisionally transmitted to the N output terminals O, thereby realizing the data selection of the plurality of demultiplexers DE.

It should be noted that in one embodiment, only N=3 is taken as an example for description. In other optional embodiments of the present disclosure, N may one of 2, 4, and another positive integer greater than or equal to 2, which is not specifically limited in one embodiment. Normally, N should not be too large, and N is less than or equal to 8.

In the display panel provided in one embodiment, the plurality of demultiplexers DE includes at least one first demultiplexer DE1 each having the N first switching elements T1 that are disposed in the display area AA. Compared to the related art, the number of demultiplexers in the non-display area NA can be reduced, which is advantageous for reducing the area of the non-display area NA on the binding area BD side. Moreover, other circuits or electronic components can be disposed in a position where the at least one first demultiplexer DE1 is originally set, which is advantageous for the highly integrated design of the non-display area NA, and further facilitates narrowing the frame of the non-display area NA on the binding area BD side.

It should be noted that, in various embodiments of the present disclosure, the N first switching elements T1 may be one of an N-type thin film transistor and a P-type thin film transistor. Optionally, the multiplex distribution circuit DC may select only an N-type thin film transistor, may also select only a P-type thin film transistor, and may also mix and match an N-type thin film transistor and a P-type thin film transistor, which are not specifically limited in the embodiments of the present disclosure. To facilitate the description of the technical solutions of the embodiments of the present disclosure, in the embodiments of the present disclosure, the N first switching elements are a P-type thin film transistor as an example for description.

Figure 2:
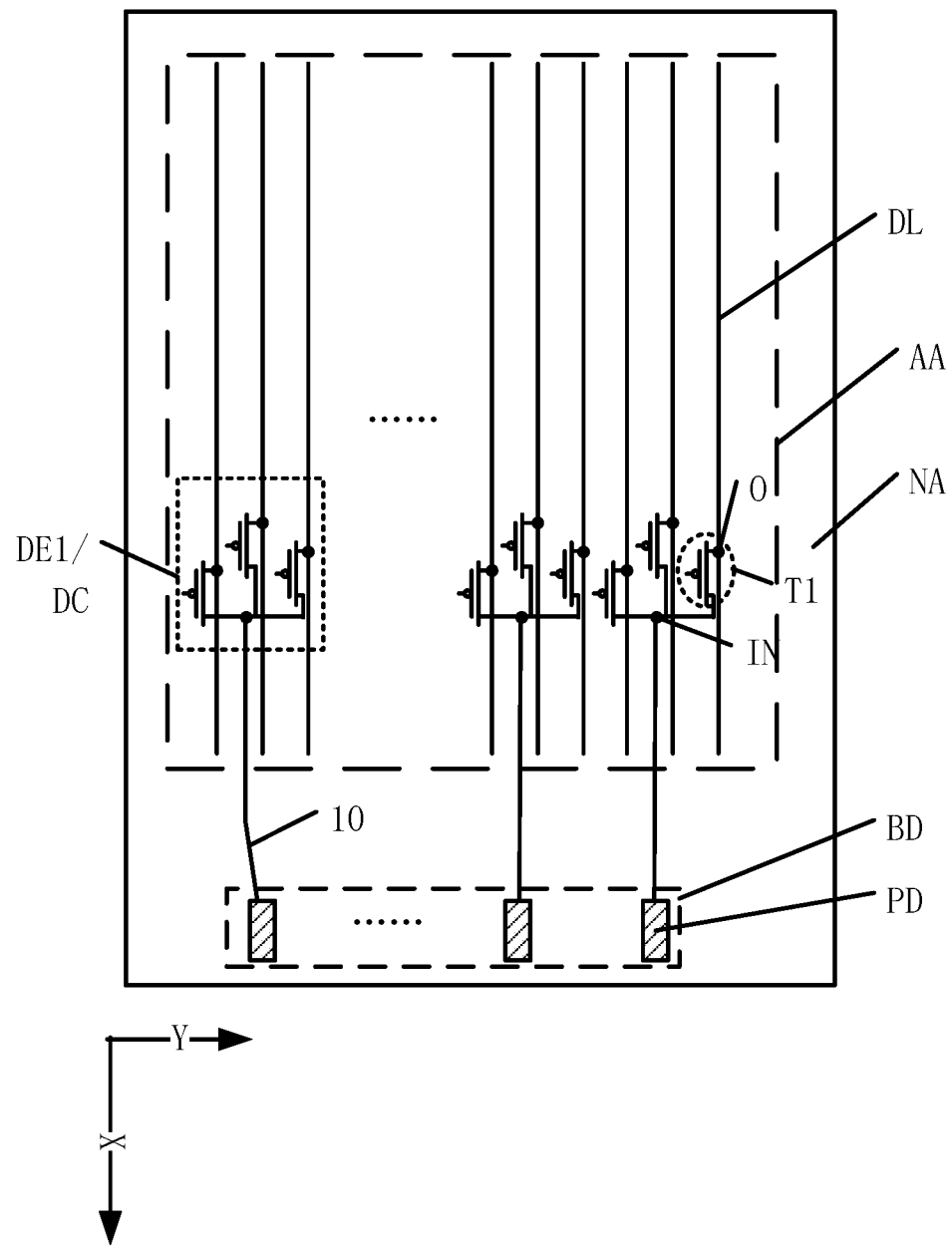
FIG. 2 is a schematic plan view showing another display panel according to one embodiment of the present disclosure.

In some optional embodiments, referring to FIG. 2, which is a schematic plan view showing another display panel according to one embodiment of the present disclosure.

The at least one first demultiplexer DE1 includes all of the plurality of demultiplexers DE disposed in the display area. In the display panel provided in one embodiment, the plurality of demultiplexers DE in the multiplex distribution circuit DC is all disposed in the display area AA, and the plurality of demultiplexers DE is not disposed in the non-display area NA. Unlike conventional display panels, the area of the non-display area NA can be reduced, which further facilitates narrowing the frame of the display panel.

Figure 3:
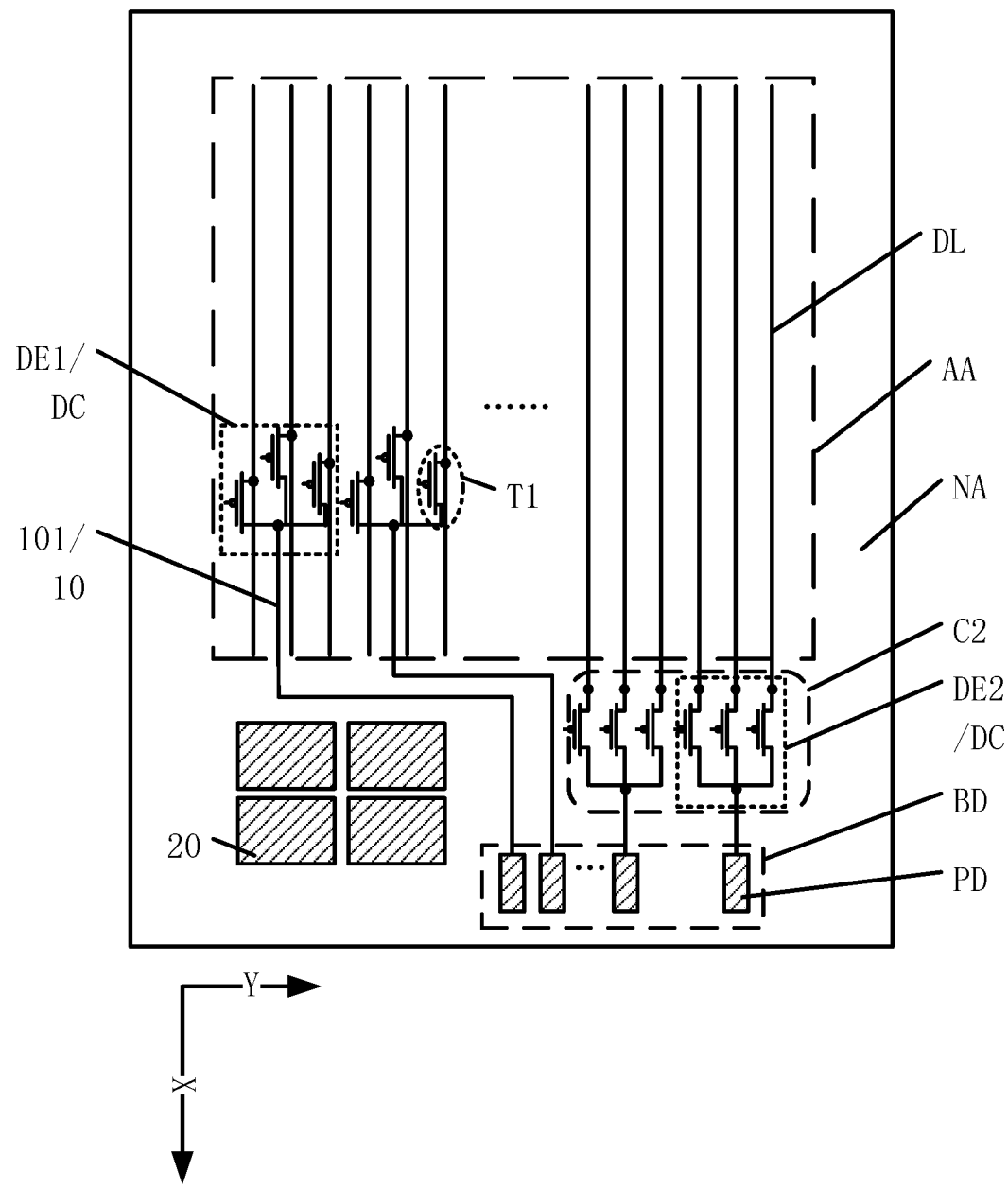
FIG. 3 is a schematic plan view showing another display panel according to one embodiment of the present disclosure.

In some optional embodiments, referring to FIG. 3, which is a schematic plan view of another display panel according to one embodiment of the present disclosure.

In one embodiment, the plurality of demultiplexers DE includes at least one second demultiplexer DE2, and the at least one second demultiplexer DE2 is located between the binding area BD and the display area AA.

Optionally, continuing to referring to FIG. 3, the plurality of connecting lines 10 includes first connecting lines 101, that are electrically connected to the one input terminal IN of the at least one first demultiplexer DE1.

The at least one second demultiplexer DE2 is located in a second circuit area C2.

The non-display area NA further includes at least one signal pad 20;

In the non-display area NA, the second circuit area C2 and the at least one signal pad 20 are respectively located on opposite sides of the first connecting lines 101 in the second direction Y.

In one embodiment, the at least one signal pad 20 is also disposed in the non-display area. The at least one signal pad 20 is usually made of a metal material and has good conductivity for transmitting electrical signals for the structure in the display panel. For example, the at least one signal pad 20 can be a VT test pad for transmitting electrical signals to the display panel during a VT test phase. The at least one signal pad 20 can also be other types of test pads, or ground pads, etc., and the specific function of the at least one signal pad 20 is not specifically limited in one embodiment.

It should be noted that in FIG. 3, only four as the number of the at least one signal pad 20 is described as an example. Alternatively, the number of the at least one signal pad 20 may be 1, 2, 3, 5 or more. A specific number of the at least one signal pad 20 is set according to actual requirements of the display panel, which is not specifically limited in one embodiment.

In the non-display area, the at least one signal pad 20 is located on one side of the first connecting lines 101 in the second direction Y, the at least one second demultiplexer DE2 is disposed in the second circuit area C2, and the second circuit area C2 is located on another side of the first connecting lines 101 in the second direction Y.

In a display panel provided by the related art, an area of a signal pad is limited by an area of a non-display area, and the area of the signal pad is usually small, and only false pressure can be used for testing, resulting in an increase in cost and testing failure rate. In the display panel provided by one embodiment, the N first switching elements T1 of the at least one first demultiplexer DE1 are disposed in the display area AA. On one hand, it is advantageous to reduce the area of the non-display area, and on another hand, while ensuring that the display panel is narrowly framed, an area of a signal pad can be appropriately increased, thereby reducing the cost and improving the testing yield.

In the display panel provided by one embodiment of the present disclosure, specific locations of the at least one first demultiplexer in the display area may be various. In the following, the present disclosure is described herein for the specific locations of the at least one first demultiplexer in the display area.

Figure 4:
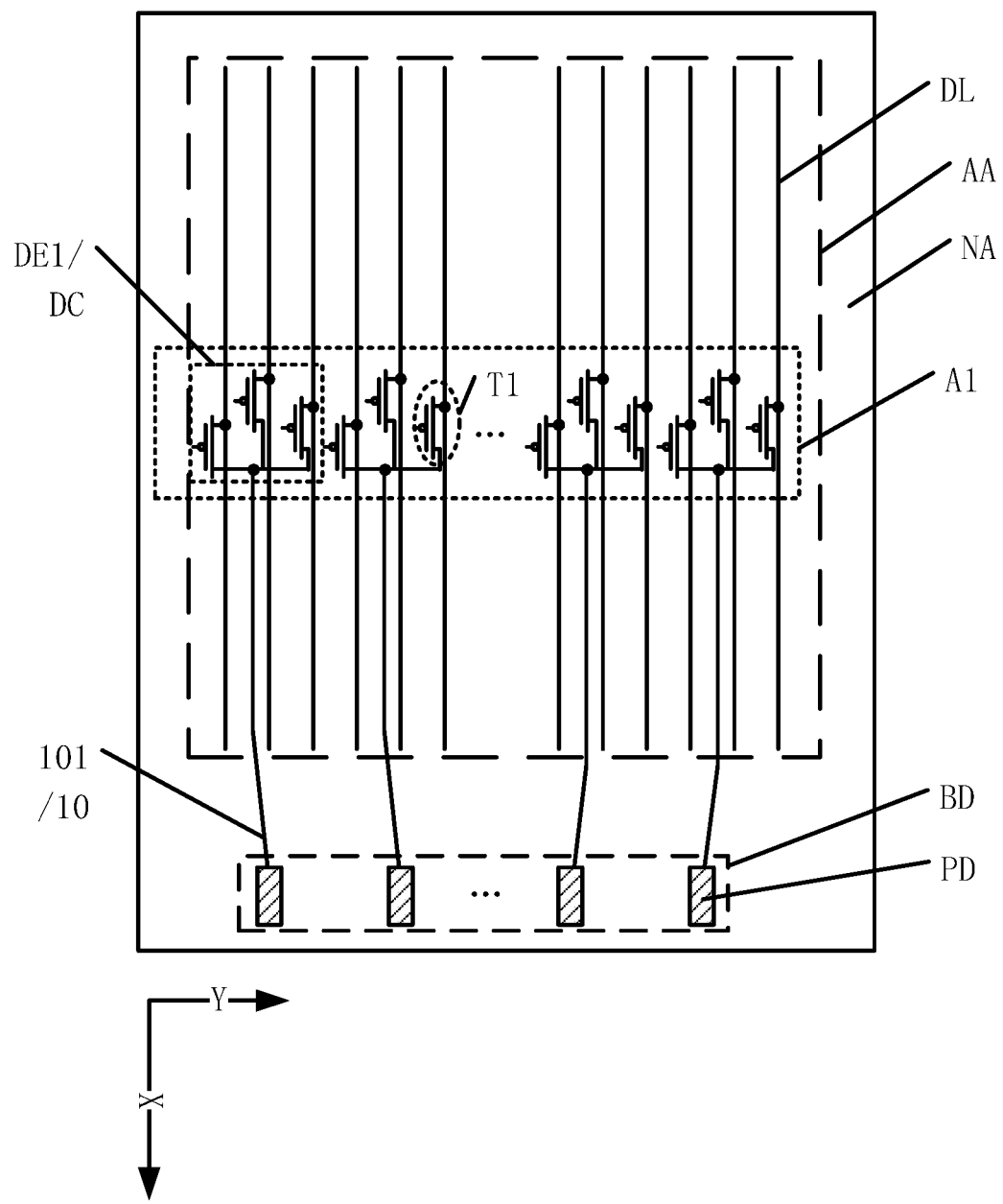
FIG. 4 is a schematic plan view showing another display panel according to one embodiment of the present disclosure.

In some optional embodiments, referring to FIG. 4, which is a schematic plan view of another display panel according to one embodiment of the present disclosure.

The display area AA includes a first sub-area A1. The first sub-area A1 includes the N first switching elements T1 of the at least one first demultiplexer DE1.

In the display panel provided by one embodiment, the N first switching elements T1 of the at least one first demultiplexer DE1 are collectively disposed in the first sub-area A1, which is advantageous for reducing the difficulty of wiring and simplifying the layout of the display panel. It can be understood that the relative position of the first sub-area A1 in the display area AA can be various. One embodiment is described by taking the first sub-area A1 in the middle of the display area AA as an example. Moreover, the size of the first sub-area A1 needs to be designed according to the actual number of the N first switching elements T1, which is not specifically limited in one embodiment.

Figure 5:
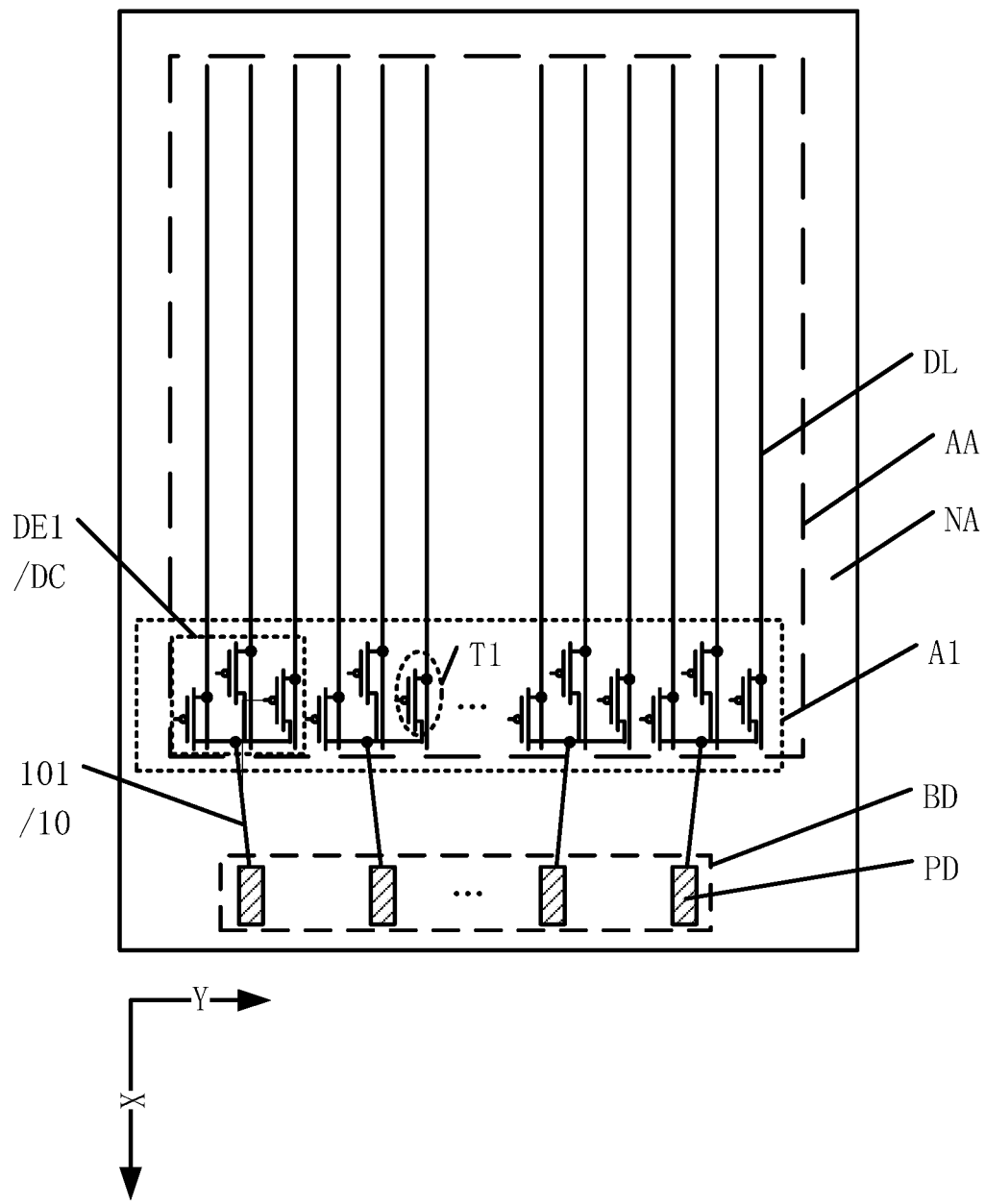
FIG. 5 is a schematic plan view showing another display panel according to one embodiment of the present disclosure.

In some optional embodiments, referring to FIG. 5, which is a schematic plan view of another display panel according to one embodiment of the present disclosure.

In one embodiment, the first sub-area A1 is located on a side of the display area AA adjacent to the binding area BD.

In the display panel provided in one embodiment, the N first switching elements T1 of the at least one first demultiplexer DE1 are collectively disposed in the first sub-area A1, and the first sub-area A1 is located in the display area AA adjacent to the binding area BD, which is therefore advantageous for reducing a length of the first connecting lines 101, so that the space occupied by the first connecting lines 101 in the display area AA can be reduced, which is advantageous for simplifying the wiring design of the display area AA, and is advantageous for improving the aperture ratio of the display area AA, thereby improving the display quality.

Figure 6:
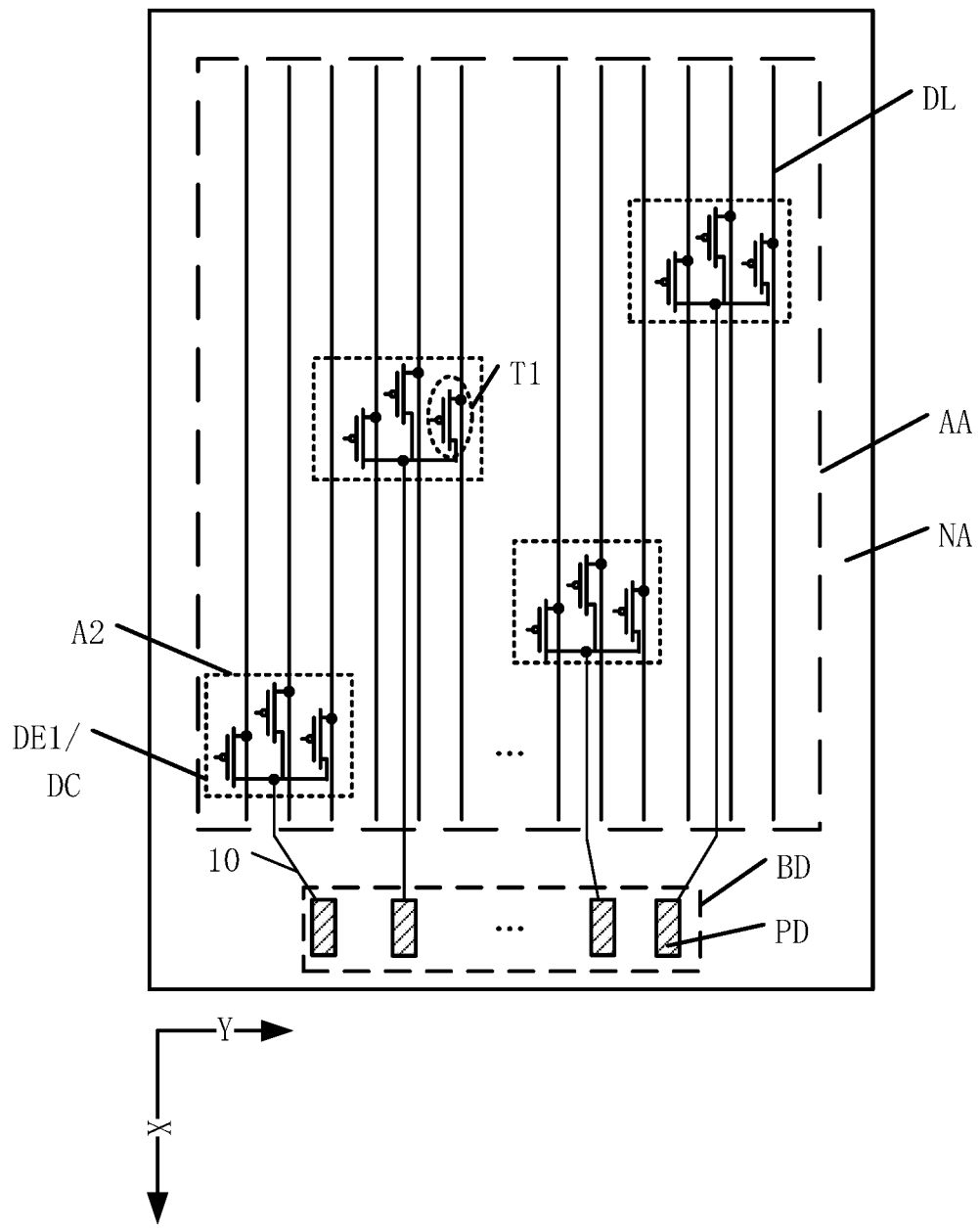
FIG. 6 is a schematic plan view showing another display panel according to one embodiment of the present disclosure.

In some optional embodiments, referring to FIG. 6. FIG. 6 is a schematic plan view of another display panel according to one embodiment of the present disclosure.

In one embodiment, the display area AA includes a plurality of second sub-areas A2, and the plurality of second sub-areas A2 includes the N first switching elements T1 of the at least one first demultiplexer DE1.

In the display panel provided in one embodiment, the plurality of second sub-areas A2 is disposed in the display area AA, and the N first switching elements T1 of the at least one first demultiplexer DE1 are disposed in each of the plurality of second sub-areas A2. It should be noted that, in FIG. 6, only one embodiment in which three first switching elements T1 of each of the at least one first demultiplexer DE1 are disposed in each of the plurality of second sub-areas A2 is illustrated. It can be understood that, in each of the plurality of second sub-areas A2, the N first switching elements T1 of two or more of the at least one first demultiplexer DE1 may be disposed, and the present disclosure will not be described again in the drawings.

In one embodiment, the N first switching elements T1 of the at least one first demultiplexer DE1 are dispersedly disposed in the plurality of second sub-areas A2, and specific position of the plurality of second sub-areas A2 can be set according to actual situation of the display area, so that the layout of the display panel is more flexible.

Figure 7:
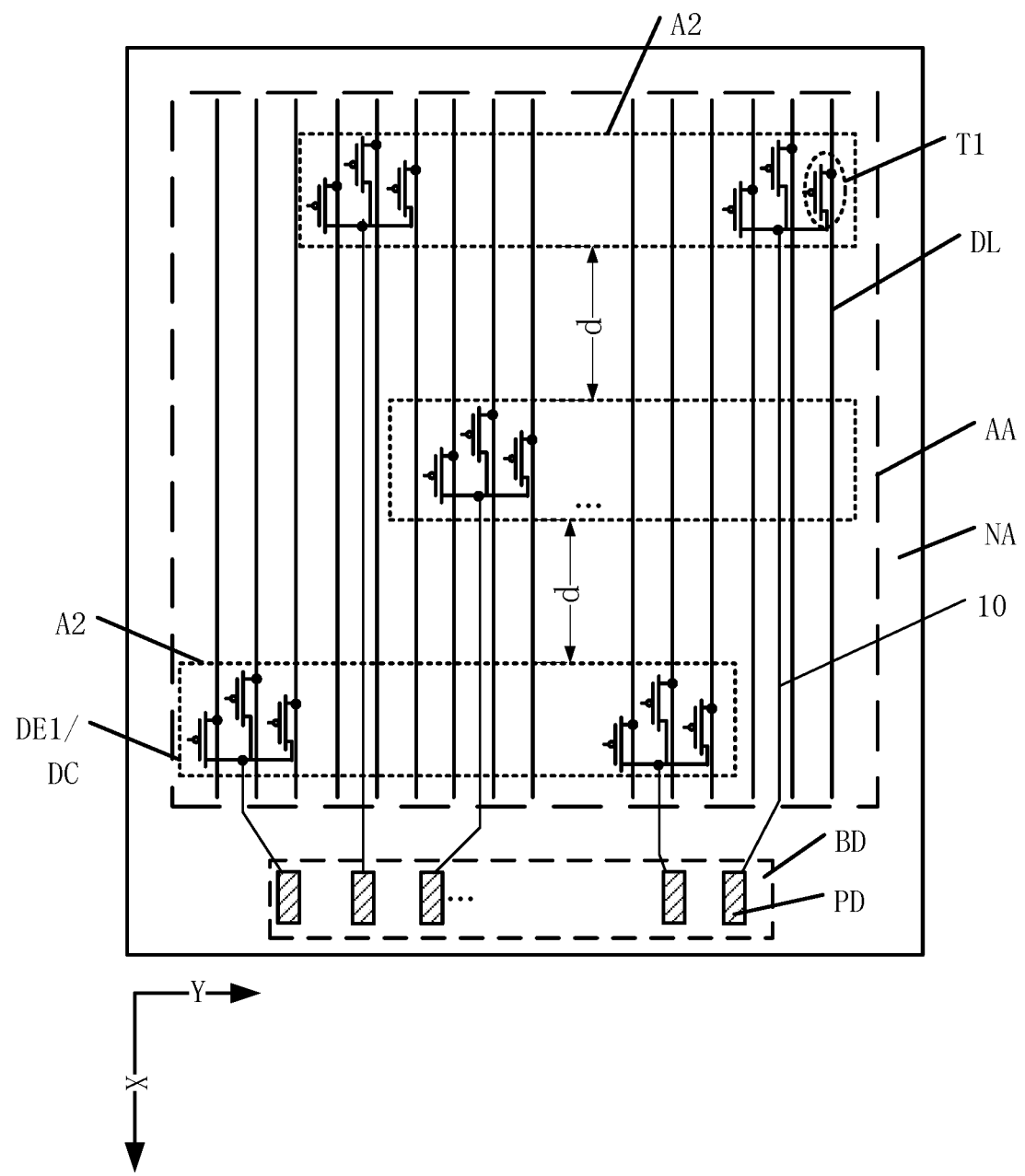
FIG. 7 is a schematic plan view showing another display panel according to one embodiment of the present disclosure.

In some optional embodiments, referring to FIG. 7. FIG. 7 is a schematic plan view of another display panel according to one embodiment of the present disclosure.

In one embodiment, each of the plurality of second sub-areas A2 has a strip shape extending in the second direction Y, and any adjacent two of the plurality of second sub-areas A2 have a spacing along the first direction X.

In the display panel provided in one embodiment, the plurality of second sub-areas A2 has a strip shape. Optionally, a length of the plurality of second sub-areas A2 along the second direction Y is about the same as a length of the display area AA along the second direction Y.

There is a certain spacing between any adjacent two of the plurality of second sub-areas A2. Optionally, the spacing between any adjacent two of the plurality of second sub-areas A2 may be the same or different, which is not specifically limited in one embodiment. In one embodiment, the spacing between second sub-areas can be set according to the actual situation of the display area, so that the layout of the display panel is more flexible.

In some optional embodiments, continue to referring to FIG. 7. In one embodiment, the spacing between any adjacent two of the plurality of second sub-areas A2 along the first direction X is the same. In other words, in the display panel provided in one embodiment, the plurality of second sub-areas A2 is equally spaced, and the spacing between any adjacent two of the plurality of second sub-areas A2 is d.

The display panel provided in this embodiment is advantageous for uniformly distributing the plurality of second sub-areas A2 in the display area AA, thereby facilitating the uniformity of the display effect of the display area and ensuring the display quality of the display panel.

In an exemplary embodiment, the at least one first demultiplexer DE1 is configured in a same row along the second direction in the first sub-area A1. In another exemplary embodiment, the at least one first demultiplexer DE1 includes a plurality of first demultiplexers, configured in different rows along the second direction, and a second sub-area A2 of the plurality of second sub-areas A2 includes N first switching elements T1 of one or more first demultiplexers DE1 in a same one row.

It should be noted that the embodiments shown in FIGS. 5-7 illustrate only specific positions of the at least one first demultiplexer in the display area. Optionally, the at least one first demultiplexer can also have multiple locations in the display area may, which will not be described again in the present disclosure.

It should be noted that the embodiments shown in FIGS. 5-7 are described by taking an example in which the plurality of demultiplexers are all disposed in the display area. Optionally, only some of the plurality of demultiplexers may be disposed in the display area, and others of the plurality of demultiplexers are reserved in the non-display area, where the setting manner of the at least one first demultiplexer in the display area may be referred to the embodiments shown in FIGS. 5-7.

Figure 8:
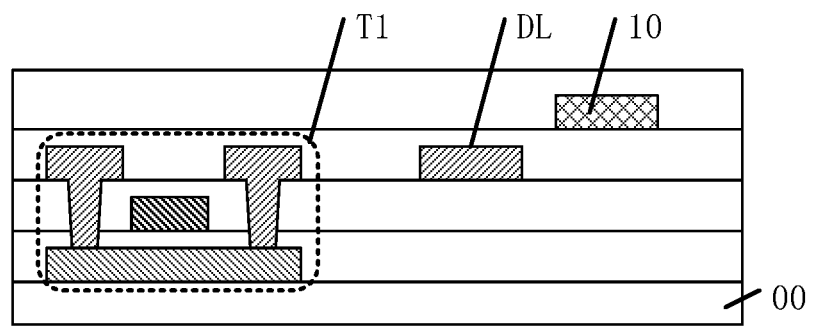
FIG. 8 is a schematic structural view of a film layer of the display panel shown in FIG. 7.

In some optional embodiments, referring to FIG. 7 and FIG. 8. FIG. 8 is a schematic structural view of a film layer of the display panel shown in FIG. 7.

In one present embodiment, in the display area AA, the plurality of connecting lines 10 and the plurality of data lines DL extend in a same direction, and the plurality of connecting lines 10 and the plurality of data lines DL are disposed in different conductive layers.

In the display panel provided in one embodiment, a part of the routing of the plurality of connecting lines 10 in the display area AA extends in the first direction X, which is the same as the extension direction of the plurality of data lines DL. The extension direction of the plurality of connecting lines 10 is the same as the extension direction of the plurality of data lines DL, which is advantageous for simplifying the layout design of the display panel.

The plurality of connecting lines 10 and the plurality of data lines DL are respectively disposed in different conductive layers. In one embodiment, only a case when the plurality of connecting lines 10 is disposed on a side of the plurality of data lines DL away from a base substrate 00 is described as an example. Alternatively, the plurality of connecting lines 10 may also be disposed on a side of the plurality of data lines DL adjacent to the base substrate 00.

Since the plurality of connecting lines 10 and the plurality of data lines DL are respectively disposed in different conductive layers, it is advantageous to reduce the spacing of the plurality of connecting lines 10 and the plurality of data lines DL in a horizontal direction (the horizontal direction is parallel to the plane of the base substrate 00), simplifying the process difficulty of making the display panel and reducing the cost. In other optional implementation manners of one embodiment, the plurality of connecting lines 10 and the plurality of data lines DL may overlap each other in a direction perpendicular to the substrate 00, thereby further compressing the space occupied by the plurality of connecting lines 10 in the display area. It is beneficial to increase the aperture ratio of the display area, thereby improving the display quality.

Figure 9:
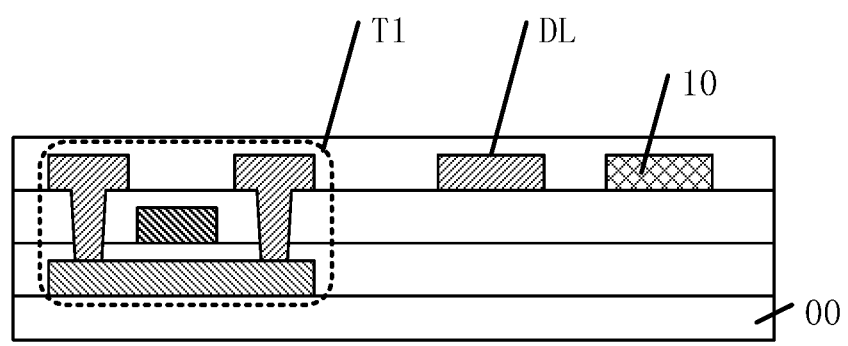
FIG. 9 is a schematic structural view of another film layer of the display panel shown in FIG. 7.

In some optional embodiments, the plurality of connecting lines and the plurality of data lines may also be disposed in a same layer. Referring to FIG. 7 and FIG. 9. FIG. 9 is a schematic structural view of another film layer of the display panel shown in FIG. 7.

In the display area AA, the plurality of connecting lines 10 and the plurality of data lines DL extend in a same direction, and the plurality of connecting lines 10 and the plurality of data lines DL are disposed in a same conductive layer. The plurality of connecting lines 10 and the plurality of data lines DL are disposed in the same layer, which is advantageous to thin and light the display panel, and is advantageous for improving production efficiency and reducing cost.

It should be noted that, to clearly explain the technical solutions of the embodiments of the present disclosure, FIGS. 8 and 9 are only schematic structural views of the film layers of the display panel shown in FIG. 7, and are not cross sectional views of the display panel cut along a specific cross section line. Similarly, the schematic structural view of the film layer in other drawings of the present disclosure is also for clearly explaining the film layer structure of the display panel, instead of a cross sectional view of the display panel cut along a specific cross section line.

Figure 10:
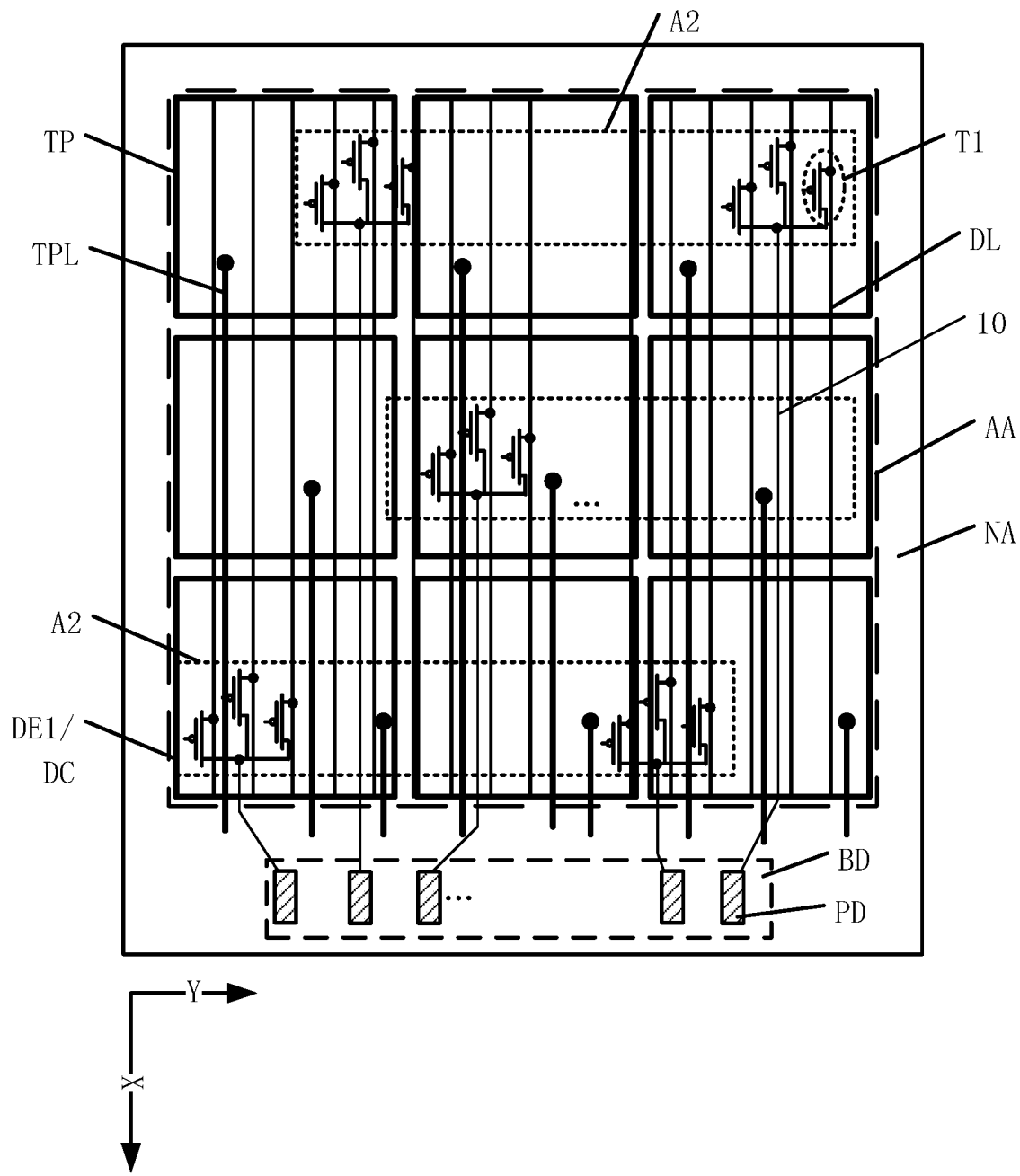
FIG. 10 is a schematic plan view showing another display panel according to one embodiment of the present disclosure.
Figure 11:
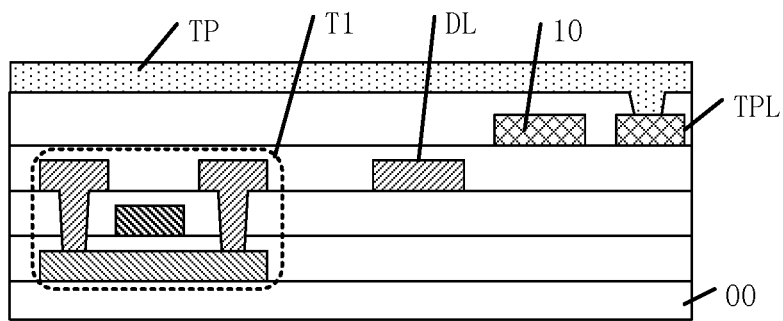
FIG. 11 is a schematic structural view of a film layer of the display panel shown in FIG. 10.

In some optional embodiments, referring to FIG. 10 and FIG. 11. FIG. 10 is a schematic plan view of the display panel according to another embodiment of the present disclosure. FIG. 11 is a schematic structural view of a film layer of the display panel shown in FIG. 10.

The display panel further includes touch electrodes TP and touch lines TPL. The touch electrodes TP and the touch lines TPL are electrically connected with each other.

The plurality of connecting lines 10 and the touch lines TPL are disposed in a same layer.

The display panel provided by one embodiment has a touch function, and the touch electrodes TP and the touch lines TPL are used to implement the touch function. In one embodiment, a film layer on which the touch lines TPL are disposed is multiplexed to dispose the plurality of connecting lines 10, which can reduce the film layer structure of the display panel, and is advantageous to thin and light the display panel. Moreover, in the manufacturing process of the display panel, the plurality of connecting lines 10 and the touch lines TPL can be simultaneously formed in a same process, which is advantageous for reducing the process of the display panel and reducing the cost.

Optionally, the touch electrodes TP can multiplex a common electrode in the display panel.

It should be noted that, in FIG. 10, only the touch electrodes TP are block-shaped, and a plurality of touch electrodes TP are in an array arrangement as an example for description. The shape and size of the touch electrodes TP are not specifically limited in one embodiment. The touch electrodes TP can be one of self-capacitive touch electrodes and mutual capacitance touch electrodes. The touch electrodes can be disposed on a same film layer or on different film layers. No specific restrictions are imposed.

Figure 12:
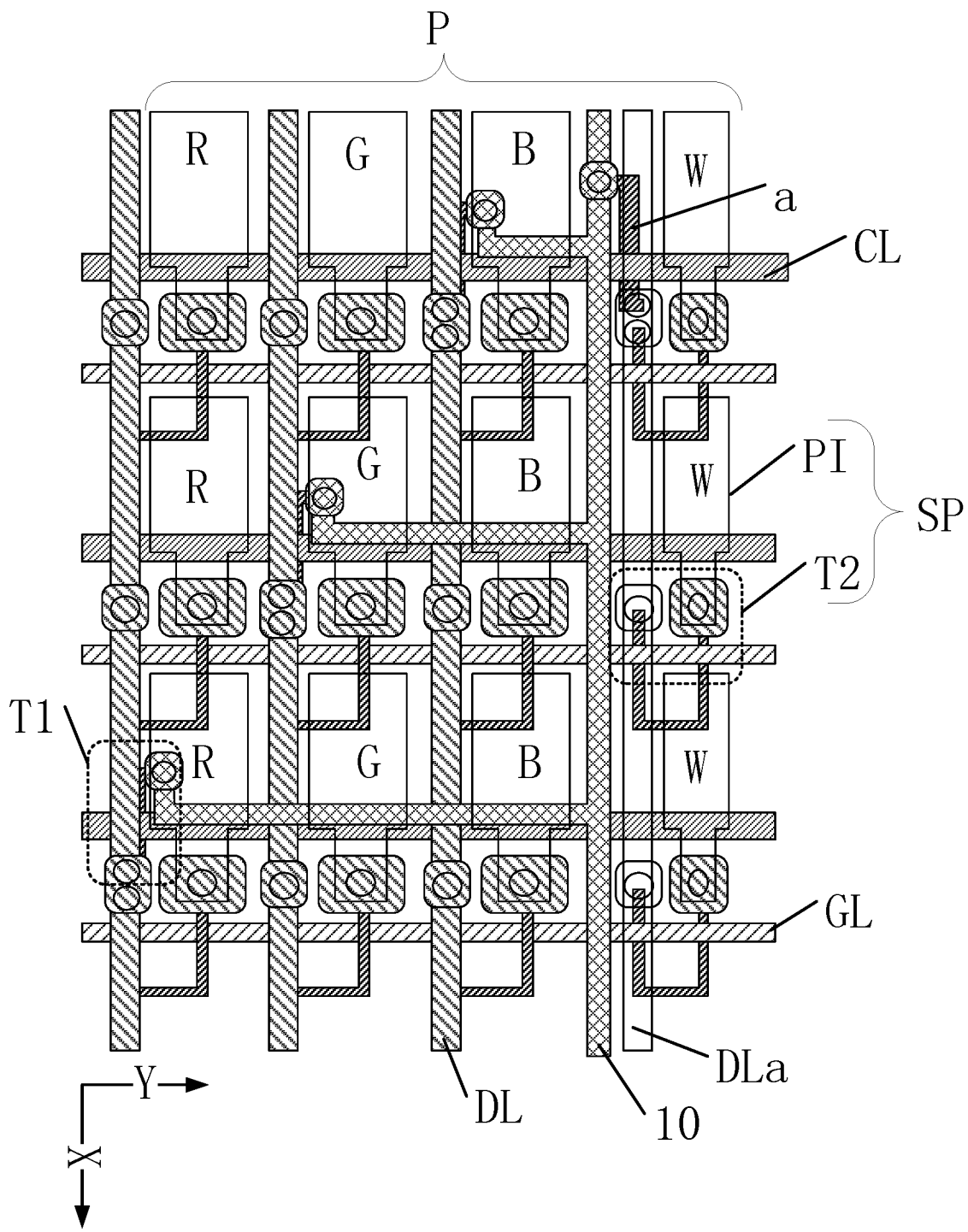
FIG. 12 is a partially enlarged schematic structural view of another display panel according to one embodiment of the present disclosure.

In some optional embodiments, referring to FIG. 12, which is a partially enlarged schematic structural view of another display panel according to one embodiment of the present disclosure.

In one embodiment, the display area AA includes a plurality of pixels P in an array arrangement along the first direction X and the second direction Y.

The plurality of pixels P includes red sub-pixels R, green sub-pixels G, blue sub-pixels B, and white sub-pixels W. Sub-pixels located in a same column along the first direction X have a same color.

The plurality of connecting lines 10 is located in an area between adjacent two columns of the sub-pixels, and one of the adjacent two columns of the sub-pixels includes white sub-pixels W.

In the display panel provided in one embodiment, the display area includes the plurality of pixels P, and the plurality of pixels P includes the red sub-pixels R, the green sub-pixels G, the blue sub-pixels B, and the white sub-pixels W. Brightness of the white sub-pixels W is generally higher, so that the area of the white sub-pixels W can be appropriately reduced.

In the display area AA, the plurality of connecting lines 10 is disposed in an area adjacent to the white sub-pixels W, and a width of the white sub-pixels W in the second direction Y can be set smaller than the sub-pixels with other colors, thereby saving space to dispose the plurality of connecting lines 10. The plurality of connecting lines 10 occupying the area of other color sub-pixels can be avoided, the color deviation phenomenon and affecting the display quality are avoided, and the layout design of the display panel is simplified.

Optionally, referring to FIG. 12, in the display panel provided in one embodiment, the N first switching elements T1 include an active layer a, and the active layer a and the plurality of data lines DL partially overlap.

In one embodiment, the active layer a of the N first switching elements T1 and the plurality of data lines DL are respectively located in different film layer structures. The active layer a and the plurality of data lines DL are partially overlapped to reduce the space occupied by the active layer a in the display panel, to increase the aperture ratio of the display area, and to improve the display quality.

It should be noted that, in order to clearly explain the technical solution of the embodiment, in FIG. 12, a data line DLa is provided without a filling pattern.

Figure 13:
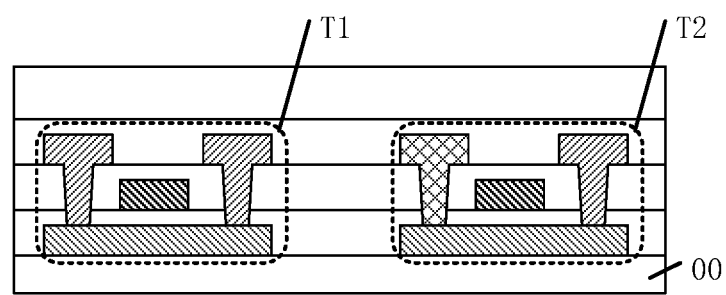
FIG. 13 is a schematic structural view of a film layer of the display panel shown in FIG. 12.

Optionally, referring to FIG. 12 and FIG. 13 together. FIG. 13 is a schematic structural view of a film layer of the display panel shown in FIG. 12.

In the display panel provided by one embodiment, the display area AA includes a plurality of pixels P in an array arrangement along the first direction X and the second direction Y. The plurality of pixels P includes sub-pixels SP with at least three different colors. A sub-pixel SP includes a second switching element T2 and a pixel electrode PI. A first electrode of the second switching element T2 is electrically connected to one dataline of the plurality of data lines DL, and a second electrode of the second switching element T2 is electrically connected to the pixel electrode PI.

The N first switching elements T1 and the second switching element T2 are disposed in a same film layer.

In one embodiment, the plurality of pixels P includes the sub-pixels SP with at least three different colors. FIG. 12 is only described by taking the plurality of pixels P including sub-pixels with four colors as an example. In other optional implementation manners of one embodiment, the purality of pixels P may include sub-pixels with three different colors, which are not illustrated in one embodiment.

The sub-pixel SP includes the second switching element T2 and the pixel electrode PI. A gate of the second switching element T2 is electrically connected to one gate line of gate lines GL, and the gate lines GL are used to control the on or off state of the second switching element T2. One data line of the plurality of data lines DL and the first electrode of the second switching element T2 are electrically connected, and the plurality of data lines DL transmits data signals to the pixel electrode PI through the second switching element T2 such that a corresponding sub-pixel SP displays different brightness.

The display panel may further include control lines CL for controlling the on or off state of the N first switching elements T1.

In one embodiment, the N first switching elements T1 and the second switching element T2 are disposed in a same film layer, that is, the N first switching elements T1 and the second switching element T2 can be fabricated in a same process, which is beneficial to improve production efficiency and reduce cost.

Figure 14:
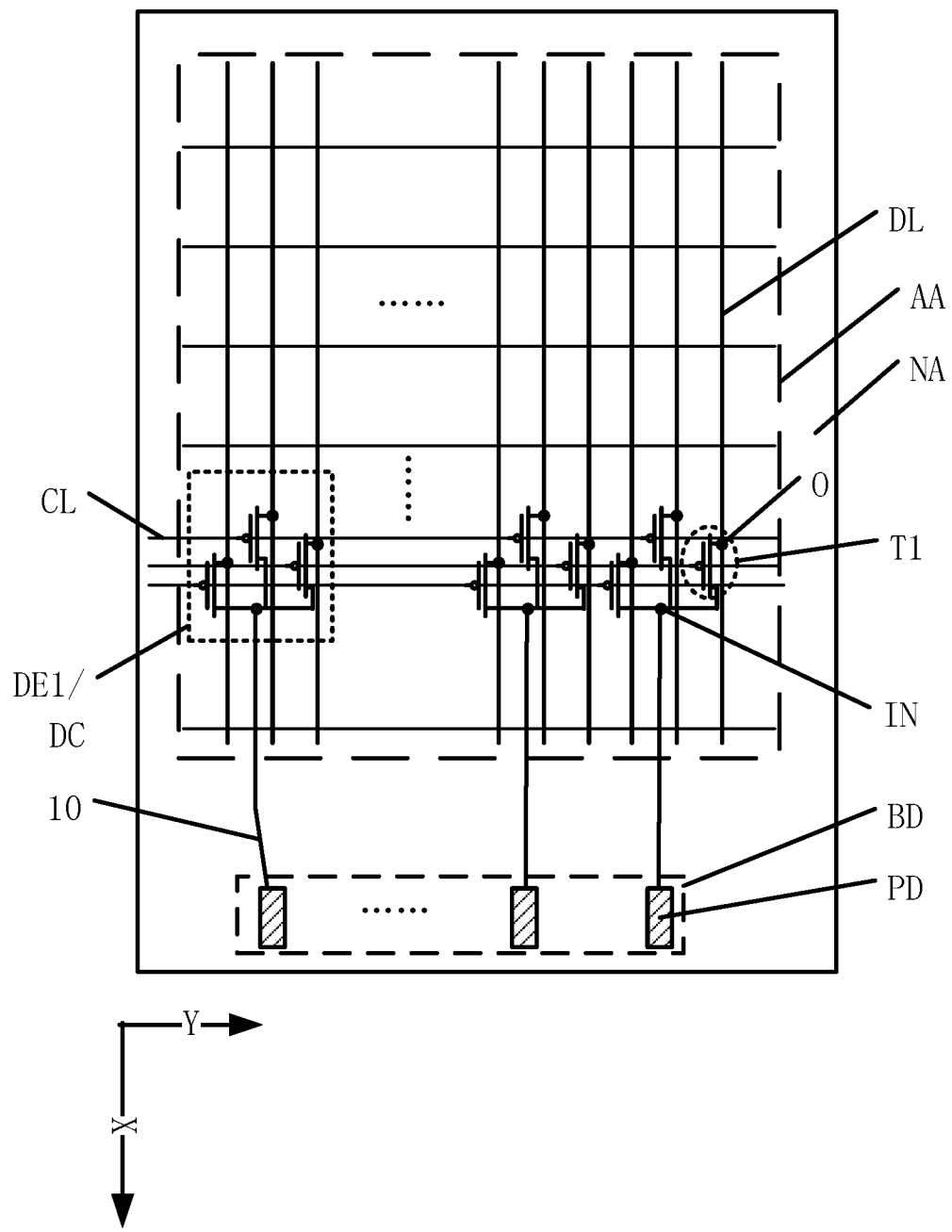
FIG. 14 is a schematic plan view showing another display panel according to one embodiment of the present disclosure.

In some optional embodiments, referring to FIG. 14, which is a schematic plan view of another display panel according to one embodiment of the present disclosure.

In one embodiment, the plurality of demultiplexers DE includes N control lines CL.

A portion of the N control lines CL of the at least one first demultiplexer DE1 is located in the display area AA.

In the display panel provided in one embodiment, only N=3 is taken as an example. A demultiplexer DE includes three first switching elements T1, and three control lines CL are respectively used to control the three first switching elements T1. For example, a control line CL and a gate of a first switching element T1 are electrically connected for controlling the on or off of the first switching element T1. Since the N first switching elements of the at least one first demultiplexer are located in the display area, correspondingly, a portion of the N control lines CL of the at least one first demultiplexer DE1 is also disposed in the display area AA. Optionally, two or more first demultiplexers DE1 can share the N control lines CL, thereby reducing the number of control lines, improving the aperture ratio of the display area, and improving display quality.

Figure 15:
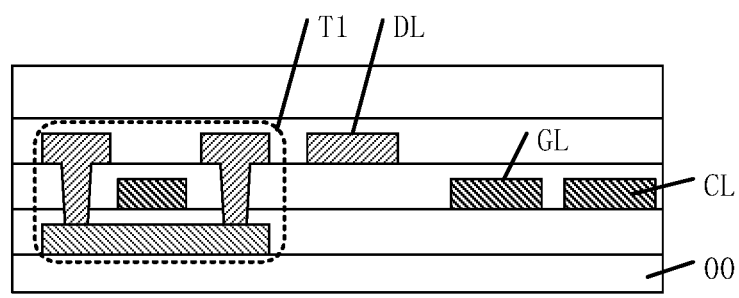
FIG. 15 is a schematic structural view of a film layer of the display panel shown in FIG. 14.

Optionally, referring to FIG. 14 and FIG. 15 together. FIG. 15 is a schematic structural view of a film layer of the display panel shown in FIG. 14.

In one embodiment, the display area AA further includes a plurality of gate lines GL.

In the display area AA, the N control lines CL and the plurality of gate lines GL extend in a same direction and are disposed in a same conductive layer.

In the display panel provided by one embodiment, both the N control lines CL and the plurality of gate lines GL extend along the second direction Y, which is advantageous for simplifying the layout design of the display panel.

The N control lines CL and the plurality of gate lines GL are disposed on the same conductive layer. On one hand, the film structure of the display panel is reduced, and the display panel is light and thin, and on another hand, in the process of fabricating the plurality of gate lines GL, the N control lines CL are formed synchronously, thereby saving the manufacturing process, reducing the cost, and improving the production efficiency.

Figure 16:
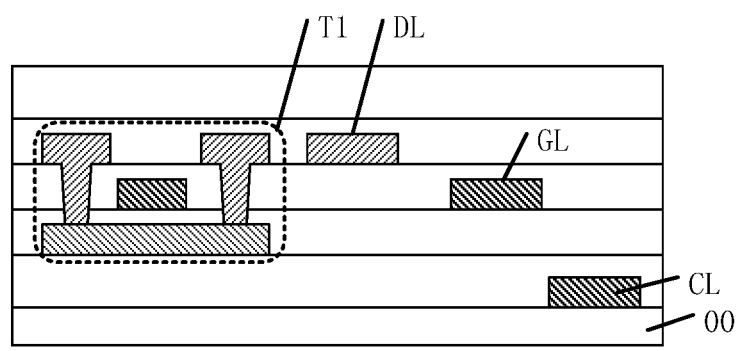
FIG. 16 is a schematic structural view of another film layer of the display panel shown in FIG. 14.

Optionally, referring to FIG. 14 and FIG. 16 together. FIG. 16 is a schematic structural view of another film layer of the display panel shown in FIG. 14.

In one embodiment, the display area AA further includes a plurality of gate lines GL.

In the display area AA, the N control lines CL and the plurality of gate lines GL extend in a same direction and are disposed in different conductive layers.

In the display panel provided by one embodiment, both the N control lines CL and the plurality of gate lines GL extend along the second direction Y, which is advantageous for simplifying the layout design of the display panel.

The N control lines CL and the plurality of gate lines GL are disposed on different conductive layers, and for example, the N control lines CL may be disposed on a side of the plurality of gate lines GL adjacent to the substrate 00. It is advantageous to reduce the spacing between the N control lines CL and the plurality of gate lines GL in the horizontal direction (the horizontal direction is parallel to the plane of the substrate 00), simplifying the process difficulty of manufacturing the display panel, and reducing the cost. In other optional implementation manners of one embodiment, the N control lines CL and the plurality of gate lines GL may overlap each other in a direction perpendicular to the substrate 00, thereby further compressing the space occupied by the N control lines CL in the display area. It is beneficial to increase the aperture ratio of the display area, thereby improving the display quality.

Figure 17:
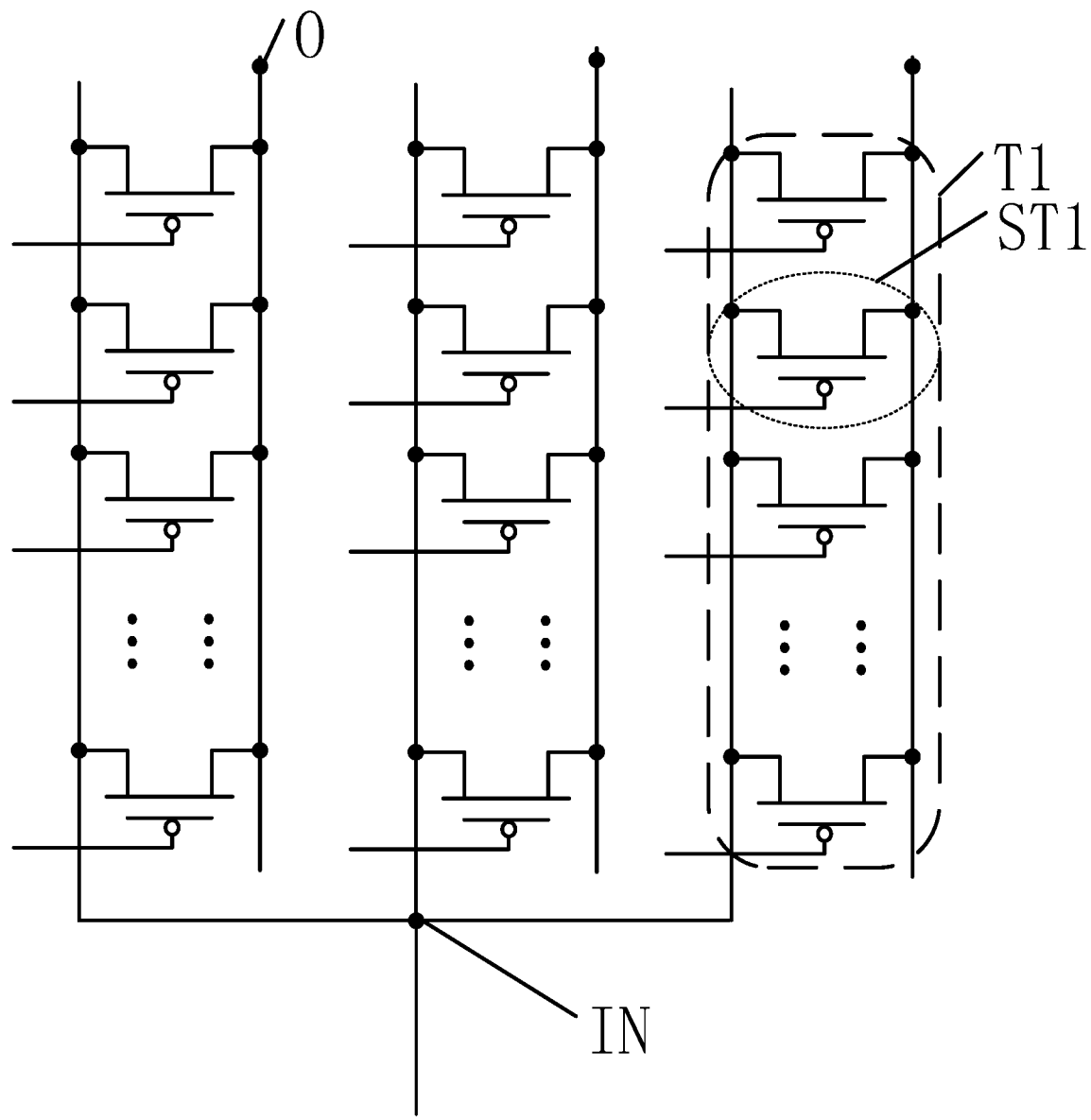
FIG. 17 is a circuit structure diagram of a first demultiplexer according to one embodiment of the present disclosure.

In some optional embodiments, referring to FIG. 17, which is a circuit structure diagram of a first demultiplexer according to one embodiment of the present disclosure.

A first switching element of the N first switching elements T1 includes X first sub-switches ST1 connected in parallel.

In a same one of the N first switching elements T1, first electrodes of the X first sub-switches ST1 are electrically connected to each other, and second electrodes of the X first sub-switches ST1 are electrically connected to each other.

X is a positive integer and X≥2.

In one embodiment, since the N first switching elements T1 are disposed in the display area, the planar area of the N first switching elements should not be too large, otherwise the aperture ratio of the display area may be affected. Since the demand for the driving capability of a first switching element T1 is relatively high, it is necessary to set the first switching element to be larger. To solve this contradiction, in one embodiment, the X first sub-switches ST1 are connected in parallel to form a first switching element T1. After a plurality of first sub-switches ST1 are connected in parallel, the driving capability is larger than that of a single first sub-switch ST1, and the driving capability requirement of the first switching element T1 is met. The specific number of sub-switches ST1 can be selected according to the actual situation of the first switching element T1. Also, the plurality of first sub-switches ST1 may be dispersedly disposed at different positions in the display area, thereby preventing a single switching element from being excessively large to affect the aperture ratio of the display area or affect the display effect.

Figure 18:
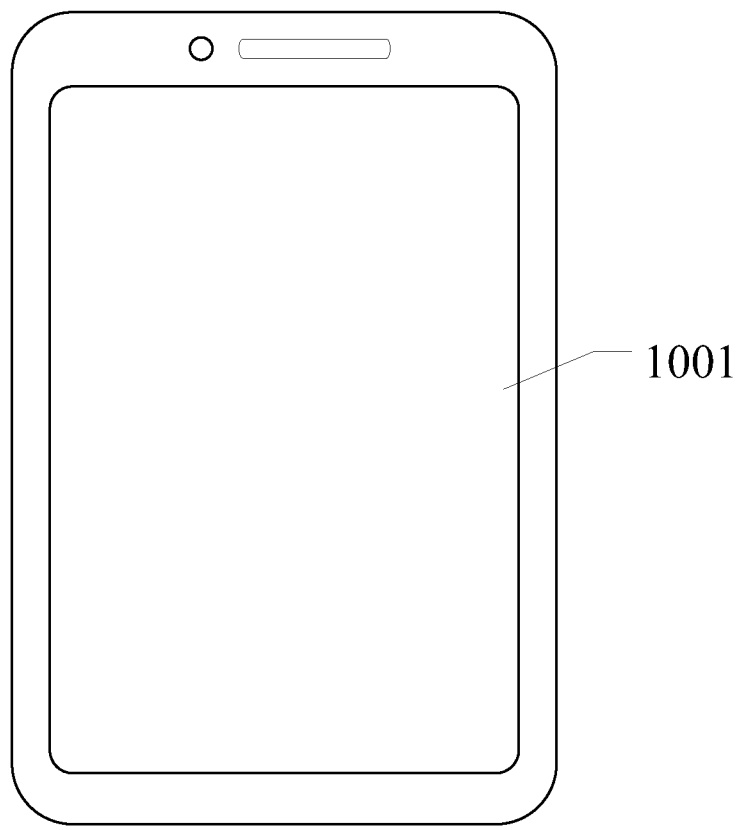
FIG. 18 is a schematic structural view of a display device according to one embodiment of the present disclosure.

The present disclosure also provides a display device including the display panel provided by any of the above embodiments of the present disclosure. Referring to FIG. 18. FIG. 18 is a schematic structural view of a display device according to one embodiment of the present disclosure. A display device 1000 provided in FIG. 18 includes a display panel 1001 provided by any of the above embodiments of the present disclosure. The display device 1000 is described by using a mobile phone as an example. It can be understood that the display device provided by one embodiment of the present disclosure may be a display device having a display function, such as a computer, a television, an in-vehicle display device, and the like. The present disclosure does not specifically limit this. The display device provided by one embodiment of the present disclosure has the beneficial effects of the display panel provided by the embodiments of the present disclosure. For details, referring to the detailed description of the display panel in the foregoing embodiments, and details are not described herein again.

Compared to the related art, the display panel and the display device provided by the present disclosure achieve at least the following beneficial effects.

To reduce the number of conductive pads, the multiplex distribution circuit is disposed in the display panel, and the plurality of data lines in the display area are electrically connected to the plurality of conductive pads through the multiplex distribution circuit. The multiplex distribution circuit includes a plurality of demultiplexers, which includes at least one first demultiplexer. The N first switching elements of the at least one first demultiplexer are disposed in the display area. Compared to the related art, the number of demultiplexers in the non-display area can be reduced, which is advantageous for reducing the area of the non-display area on the binding area side. Moreover, other circuits or electronic components can be disposed in the position where the at least one first demultiplexer is originally disposed, which is advantageous for the highly integrated design of the non-display area, and further facilitates narrowing the frame of the non-display area on the binding area side.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the preferred embodiments of the present disclosure, it is understood that it will be appreciated by those skilled in the art that the above embodiments may be modified without departing from the scope and spirit of the present disclosure. The scope of the present disclosure is defined by the appended claims.

What is claimed is:

1. A display panel, comprising:
    a display area and a non-display area,
        wherein the display area includes a plurality of data lines; the plurality of data lines extends along a first direction, and the plurality of data lines is arranged along a second direction; and
        the non-display area includes a binding area, and the binding area includes a plurality of conductive pads;
    a multiplex distribution circuit,
        wherein the multiplex distribution circuit includes a plurality of demultiplexers; and each of the plurality of demultiplexers includes: one input terminal, N output terminals together corresponding to the one input terminal, and N first switching elements each used to connect the one input terminal with an output terminal of the N output terminals; and
    a plurality of connecting lines, each connecting line connecting the one input terminal of a demultiplexer of the plurality of demultiplexers with a conductive pad of the plurality of conductive pads,
        wherein each of the N output terminals is electrically connected to one data line of the plurality of data lines; and
        the plurality of demultiplexers contains at least one first demultiplexer each having the N first switching elements that are disposed in the display area; wherein: N is a positive integer and N≥2.

2. The display panel according to claim 1, wherein:
    the at least one first demultiplexer includes all of the plurality of demultiplexers disposed in the display area.

3. The display panel according to claim 1, wherein:
    the plurality of demultiplexers contains at least one second demultiplexer, and the at least one second demultiplexer is located between the binding area and the display area.

4. The display panel according to claim 3, wherein:
    the plurality of connecting lines contains first connecting lines that are electrically connected to the one input terminal of the at least one first demultiplexer;
    the at least one second demultiplexer is located in a second circuit area;
    the non-display area further includes at least one signal pad; and
    in the non-display area, the second circuit area and the at least one signal pad are respectively located on opposite sides of the first connecting lines along the second direction.

5. The display panel according to claim 1, wherein:
    the display area includes a first sub-area, and the first sub-area includes the N first switching elements of the at least one first demultiplexer.

6. The display panel according to claim 5, wherein:
    the first sub-area is located on a side of the display area adjacent to the binding area.

7. The display panel according to claim 1, wherein:
    the display area includes a plurality of second sub-areas, and the plurality of second sub-areas includes the N first switching elements of the at least one first demultiplexer.

8. The display panel according to claim 7, wherein:
    each of the plurality of second sub-areas has a strip shape extending along the second direction, and any adjacent two of the plurality of second sub-areas have a spacing along the first direction.

9. The display panel according to claim 8, wherein:
    any adjacent two of the plurality of second sub-areas have an equal spacing.

10. The display panel according to claim 1, wherein:
    in the display area, the plurality of connecting lines and the plurality of data lines extend in a same direction, and the plurality of connecting lines and the plurality of data lines are disposed in different conductive layers.

11. The display panel according to claim 10, further comprising:
    touch electrodes and touch lines, wherein:
    the touch electrodes and the touch lines are electrically connected with each other; and
    the plurality of connecting lines and the touch lines are disposed in a same layer.

12. The display panel according to claim 1, wherein:
    in the display area, the plurality of connecting lines and the plurality of data lines extend in a same direction, and the plurality of connecting lines and the plurality of data lines are disposed in a same conductive layer.

13. The display panel according to claim 12, wherein:
    the display area includes a plurality of pixels in an array arrangement along the first direction and the second direction;
    the plurality of pixels includes red sub-pixels, green sub-pixels, blue sub-pixels, and white sub-pixels; and sub-pixels located in a same column along the first direction have a same color; and
    the plurality of connecting lines is located in an area between adjacent two columns of the sub-pixels, and one of the adjacent two columns of the sub-pixels includes white sub-pixels.

14. The display panel according to claim 1, wherein:
    the plurality of demultiplexers includes N control lines; and
    a portion of the N control lines of the at least one first demultiplexer is located in the display area.

15. The display panel according to claim 14, wherein:
    the display area further includes a plurality of gate lines; and
    in the display area, the N control lines and the plurality of gate lines extend in a same direction and are disposed on a same conductive layer.

16. The display panel according to claim 14, wherein:
    the display area further includes a plurality of gate lines; and
    in the display area, the N control lines and the plurality of gate lines extend in a same direction and are disposed on different conductive layers.

17. The display panel of claim 1, wherein:
    a first switching element of the N first switching elements includes X first sub-switches connected in parallel with each other; and
    in a same one of the N first switching elements, first electrodes of the X first sub-switches are electrically connected to each other, and second electrodes of the X first sub-switches are electrically connected to each other; wherein:
    X is a positive integer and X≥2.

18. The display panel of claim 1, wherein:
    the display area includes a plurality of pixels in an array arrangement along the first direction and the second direction;

the plurality of pixels includes sub-pixels with at least three different colors, each of the sub-pixels includes a second switching element and a pixel electrode, a first electrode of the second switching element is electrically connected to one data line of the plurality of data lines, and a second electrode of the second switching element is electrically connected to the pixel electrode; and the N first switching elements and the second switching element are disposed in a same film layer.

19. The display panel of claim 1, wherein:

the N first switching elements include an active layer, and the active layer and the plurality of data lines partially overlap.

20. A display device, comprising:

a display panel comprising:

a display area and a non-display area, wherein the display area includes a plurality of data lines; the plurality of data lines extends along a first direction, and the plurality of data lines is arranged along a second direction; and the non-display area includes a binding area, and the binding area includes a plurality of conductive pads;

a multiplex distribution circuit, wherein the multiplex distribution circuit includes a plurality of demultiplexers; and each of the plurality of demultiplexers includes: one input terminal, N output terminals together corresponding to the one input terminal, and N first switching elements each used to connect the one input terminal with an output terminal of the N output terminals; and a plurality of connecting lines, each connecting line connecting the one input terminal of a demultiplexer of the plurality of demultiplexers with a conductive pad of the plurality of conductive pads, wherein each of the N output terminals is electrically connected to one data line of the plurality of data lines; and the plurality of demultiplexers contains at least one first demultiplexer each having the N first switching elements that are disposed in the display area; wherein:

N is a positive integer and N≥2.

* * * * *